US009509407B2

(12) United States Patent
Gottwald

(10) Patent No.: US 9,509,407 B2
(45) Date of Patent: Nov. 29, 2016

(54) METHOD AND DEVICE FOR CONVEYING OPTICAL DATA

(71) Applicant: Xieon Networks S.a.r.l., Luxemburg (LU)

(72) Inventor: Erich Gottwald, Holzkirchen (DE)

(73) Assignee: Xieon Networks S.a.r.l., Luxembourg (LU)

( * ) Notice: Subject to any disclaimer, the term of this patent is extended or adjusted under 35 U.S.C. 154(b) by 0 days.

(21) Appl. No.: 14/410,173

(22) PCT Filed: Aug. 21, 2013

(86) PCT No.: PCT/EP2013/067360
§ 371 (c)(1),
(2) Date: Dec. 22, 2014

(87) PCT Pub. No.: WO2014/029797
PCT Pub. Date: Feb. 27, 2014

(65) Prior Publication Data
US 2015/0318923 A1  Nov. 5, 2015

(30) Foreign Application Priority Data
Aug. 22, 2012 (EP) .................................... 12181369

(51) Int. Cl.
*H04J 14/02* (2006.01)
*H04B 10/27* (2013.01)
*H04B 10/50* (2013.01)
*H04B 10/516* (2013.01)
*H04B 10/66* (2013.01)

(52) U.S. Cl.
CPC ............ *H04B 10/27* (2013.01); *H04B 10/504* (2013.01); *H04B 10/5165* (2013.01); *H04B 10/66* (2013.01); *H04J 14/0224* (2013.01); *H04J 14/0227* (2013.01); *H04J 14/025* (2013.01); *H04J 14/0246* (2013.01); *H04J 14/0282* (2013.01)

(58) Field of Classification Search
CPC   H04B 10/27; H04B 10/5165; H01J 14/0227
See application file for complete search history.

(56) References Cited

U.S. PATENT DOCUMENTS

| 2005/0047793 | A1* | 3/2005 | Butler | H04B 10/25137 398/149 |
| 2006/0291868 | A1 | 12/2006 | Yee et al. | |
| 2007/0274728 | A1* | 11/2007 | Bergano | H04B 10/2563 398/152 |
| 2011/0182584 | A1* | 7/2011 | Gottwald | H04B 10/516 398/79 |
| 2011/0262131 | A1* | 10/2011 | Gottwald | H04B 10/2503 398/41 |

FOREIGN PATENT DOCUMENTS

| EP | 1213858 A2 | 6/2002 |
| EP | 1633062 A1 | 3/2006 |
| WO | 2014/029797 A1 | 2/2014 |

OTHER PUBLICATIONS

International Search Report and Written Opinion for Application No. PCT/EP2013/067360, 9 pages, dated Oct. 16, 2013.

\* cited by examiner

*Primary Examiner* — Dzung Tran
(74) *Attorney, Agent, or Firm* — Nelson Mullins Riley & Scarborough LLP

(57) ABSTRACT

A method and a device for conveying optical data are provided, wherein an optical network unit conveys data to a terminal via dual sideband modulation, wherein the terminal processes only the upper or only the lower sideband received from the optical network unit, and wherein several dual sideband modulated signals from several optical network units partially overlap when being received at the terminal. Furthermore, a communication system is suggested comprising at least one such device.

13 Claims, 11 Drawing Sheets

Fig.2

| Channel Number 201 | f_optical downstream (OLT TX) 202 | f_optical upstream (ONU TX) 203 | electrical channel spectra @ OLT RX 204 | electrical interference spectra @ OLT RX 205 |
|---|---|---|---|---|
| 1 | 2.5 ± 0.5 Δ | 1 ± 1 Δ | 1 ± 1 Δ | 2.5 ± 0.5 Δ |
| 2 | -2.5 ± 0.5 Δ | -4 ± 1 Δ | 4 ± 1 Δ | 2.5 ± 0.5 Δ |
| 3 | 6.5 ± 0.5 Δ | 5 ± 1 Δ | 5 ± 1 Δ | 6.5 ± 0.5 Δ |
| 4 | -6.5 ± 0.5 Δ | -8 ± 1 Δ | 8 ± 1 Δ | 6.5 ± 0.5 Δ |
| 5 | 10.5 ± 0.5 Δ | 9 ± 1 Δ | 9 ± 1 Δ | 10.5 ± 0.5 Δ |
| 6 | -10.5 ± 0.5 Δ | -12 ± 1 Δ | 12 ± 1 Δ | 10.5 ± 0.5 Δ |
| 7 | 14.5 ± 0.5 Δ | 13 ± 1 Δ | 13 ± 1 Δ | 14.5 ± 0.5 Δ |
| 8 | -14.5 ± 0.5 Δ | -16 ± 1 Δ | 16 ± 1 Δ | 14.5 ± 0.5 Δ |

| Channel Number | f_optical downstream (OLT TX) | f_optical upstream (ONU TX) | electrical channel spectra @ OLT RX | electrical interference spectra @ OLT RX |
| --- | --- | --- | --- | --- |
| | 202 | 203 | 204 | 205 |
| 1 | 3 ± 0.5 Δ | 1.5 ± 1 Δ | 1.5 ± 1 Δ | 3 ± 0.5 Δ |
| 2 | -3 ± 0.5 Δ | -4.5 ± 1 Δ | 4.5 ± 1 Δ | 3 ± 0.5 Δ |
| 3 | 7 ± 0.5 Δ | 5.5 ± 1 Δ | 5.5 ± 1 Δ | 7 ± 0.5 Δ |
| 4 | -7 ± 0.5 Δ | -8.5 ± 1 Δ | 8.5 ± 1 Δ | 7 ± 0.5 Δ |
| 5 | 11 ± 0.5 Δ | 9.5 ± 1 Δ | 9.5 ± 1 Δ | 11 ± 0.5 Δ |
| 6 | -11 ± 0.5 Δ | -12.5 ± 1 Δ | 12.5 ± 1 Δ | 11 ± 0.5 Δ |
| 7 | 15 ± 0.5 Δ | 13.5 ± 1 Δ | 13.5 ± 1 Δ | 15 ± 0.5 Δ |
| 8 | -15 ± 0.5 Δ | -16.5 ± 1 Δ | 16.5 ± 1 Δ | 15 ± 0.5 Δ |

Fig.3

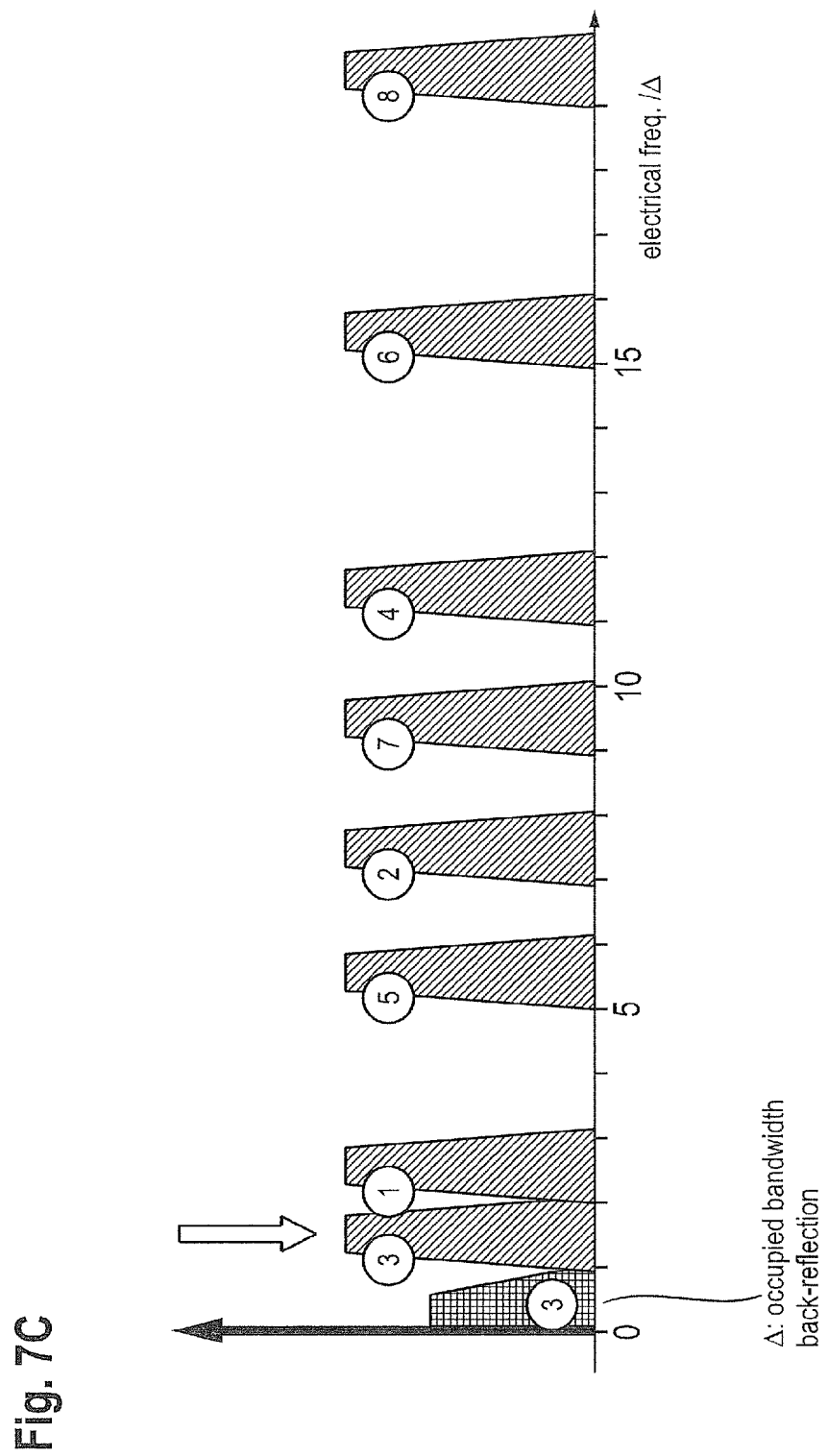

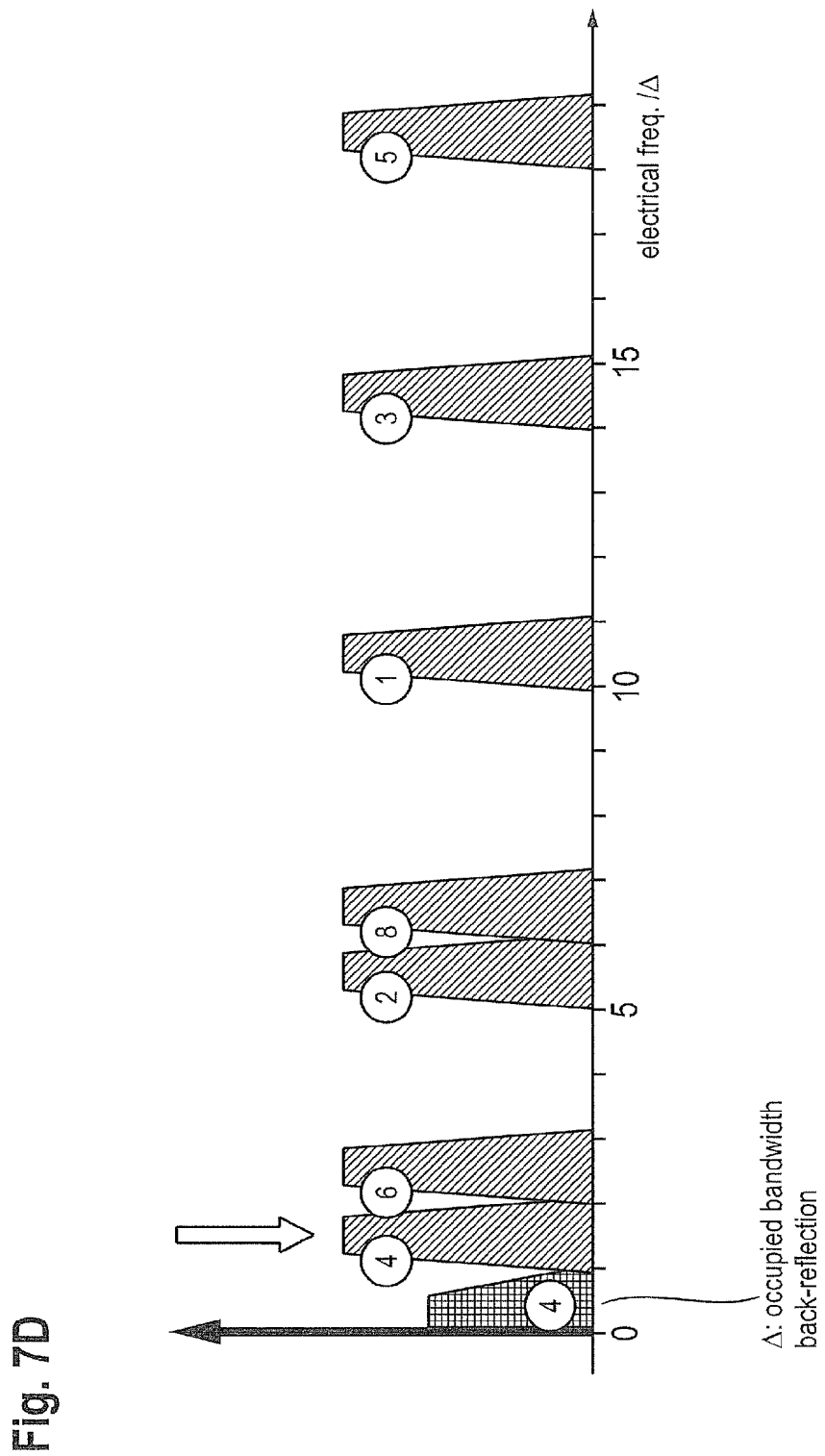

METHOD AND DEVICE FOR CONVEYING OPTICAL DATA

CROSS REFERENCE TO RELATED APPLICATIONS

This application is a U.S. National Phase Application under 35 U.S.C. §371 of International Application No. PCT/EP2013/067360, filed on Aug. 21, 2013, which in turn claims priority to European Patent Application No. 12181369.5, filed on Aug. 22, 2012, both of which are incorporated herein by reference in their entireties.

The invention relates to a method and to a device for conveying optical data.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be a promising approach for future data access.

Data transmission of spectrally densely spaced wavelengths is utilized by applications as Next Generation Optical Access (NGOA) systems allowing high data rates of, e.g., 100 Gbit/s.

In these optical scenarios, a multitude of optical wavelengths are required in order to be individually modulated. Such optical wavelengths may have a spectral distance of a few gigahertz and can be used either for an ultra-dense wavelength grid optical access system like NGOA, where each user may be assigned a wavelength of his own or for a transmission of high data rates such as 100 Gbit/s, where a multitude of wavelengths are bundled and transmitted over a small spectral range.

Providing these individual wavelengths by several discrete lasers leads to a huge amount of laser sources that require a significant amount of precision and thus involve high costs. As an alternative, modulating a multitude of single sidebands on an optical carrier also leads to significant costs because of the electronics involved needing to cope with high frequencies required.

A problem to be solved is to provide an efficient mechanism supplying a multitude of individually modulated optical wavelengths, in particular at a spectral distance amounting to a few GHz from a single laser source utilized at an OLT of an optically coherent UDWDM access network, in particular for establishing virtual point to point connections.

A method for conveying optical data (via an optical network and at least one optical fiber) is suggested
- wherein an optical network unit conveys data to a terminal via dual sideband modulation,
- wherein the terminal processes only the upper or only the lower sideband received from the optical network unit,
- wherein several dual sideband modulated signals from several optical network units partially overlap when being received at the terminal.

The optical network unit (ONU) can be a unit at a customer's premises and the terminal can be an optical line terminal (OLT) at a central location, e.g., a central office or the like. The dual sideband modulation can be used to convey information in both sidebands, whereas for reconstruction of the signal conveyed only one sideband suffices.

Hence, bandwidth can be saved by using overlapping spectra of signals from different optical network units. In addition, using dual sideband modulation at the optical network units allows for simple and cost-efficient components: the transmitter at the ONU does not require an IQ-modulator or any 90-degrees hybrid or any orthogonal sine wave generator.

In an example, the terminal is an optical line terminal connected to several optical network units.

In another example, each of the optical network units is assigned a predetermined optical bandwidth or wavelength.

For example, at least one wavelength or bandwidth may be used exclusively for a connection between the ONU and the terminal (e.g., OLT).

In a further example, the overlapping spectrum is at least partially filtered out.

In a next example, the overlapping spectrum is at least partially filtered out in combination with a single sideband or vestigial sideband detection.

Hence, the transmitted signal can be fully reconstructed from the single or vestigial sideband. For example, the lower sideband can be used for reconstructing even channels and the upper sideband can be used for reconstructing odd channels (or vice versa).

It is also an embodiment that the optical network unit conveys data to the terminal via on-off-keying.

Pursuant to another example, the terminal conveys data to the optical network unit via QPSK or DQPSK modulation.

According to an example, a frequency plan is determined for conveying data from several optical network units to the terminal in a coherent heterodyne communication system utilizing the following margins
- a bandwidth amounting to Δ in downstream direction; and
- a bandwidth amounting to 2Δ in upstream direction,
- wherein Δ determines a bandwidth occupied by a channel.

The signal or data may in particular be conveyed via said channel. The bandwidth Δ may also comprise tolerances and a guard band (e.g., in downstream and/or upstream direction).

There is also provided an optical line terminal comprising a processing unit that is arranged such that
- data from several optical network units is received, which data is dual sideband modulated;

wherein the spectra of the data received from two optical network units overlap;

the upper sideband or the lower sideband received is used to reconstruct data from one of the optical network units.

The optical line terminal may be any optical processing component that is connected via an optical fiber to at least two optical network units. The optical line terminal may be a centralized component to be associated with several optical network units. Each of the optical network units may be assigned at least one particular bandwidth or wavelength. Such optical spectrum can be used for conveying data between the optical line terminal and this particular optical network unit. The optical network unit may be deployed at a customer's premises, e.g., home, office or the like. The optical network unit may use an OOK modulation scheme for upstream communication towards the optical line terminal. The optical line terminal may use QPSK or DQPSK as a modulation scheme for downstream communication towards the optical network unit.

The optical line terminal may comprise a modulator, a transmitter, a receiver, a local oscillator and other processing means. The processing unit stated above may comprise hardware and/or software components.

According to an example, the upper sideband or the lower sideband received is used to reconstruct data by single sideband processing or vestigial sideband processing in combination with filtering of the spectrum overlap.

There is further provided an optical network unit comprising a processing unit that is arranged such that data is dual sideband modulated and transmitted to a terminal, wherein the spectrum of the data transmitted at least partially overlap with at least one spectrum used by another optical network unit such that the upper sideband or the lower sideband received by the optical line terminal can be used to reconstruct data from the optical network unit.

It is further noted that said processing units can each comprise at least one, in particular several means that are arranged to execute the steps of the method described herein. The means may be logically or physically separated; in particular several logically separate means could be combined in at least one physical unit.

Furthermore, there is also provided a communication system comprising at least one optical line terminal and at least one or at least two of the optical network units as described herein.

Examples of the invention are shown and illustrated in the following figures:

FIG. 2 shows a table comprising an exemplary optical and electrical frequency plan;

FIG. 3 shows a table comprising an alternative exemplary optical and electrical frequency plan;

FIG. 7A to FIG. 7D shows a graphical representation of the position of the channels 1 to 4 at the receivers of ONU 1 to 4, respectively.

The current invention allows for reducing or minimizing occupied optical and/or electrical bandwidth utilizing OOK-based transmitters instead of IQ transmitters at the ONUs. This significantly reduces costs for the ONUs.

In particular, a (digital) single side band receiving method is provided, e.g., at the OLT in an ultra-dense wavelength grid optical access system like NGOA, in which each user may be assigned his own wavelength.

The proposal enables using OOK modulated ONU transmitters having a usable bandwidth that could be compared to those of IQ-modulated ONU transmitters.

This can be achieved by eliminating signal distortions caused by crosstalk and by spectral overlap that add up to half of the occupied signal bandwidth in the electrical domain at the OLT-site. Such elimination may combine electrical filtering and single-sideband or vestigial-sideband reception.

Single-sideband receiving methods work well, e.g., for OOK or analogue amplitude modulation formats. Exemplary frequency plans in the optical domain and resulting signal spectra in the electrical domain are discussed below. The frequency plans may in particular even consider (and cope with) backscattering and back-reflection effects stemming from transmitted light into the receivers at the OLT and ONU at levels that are comparable to the levels of data signals received.

Figure 1:
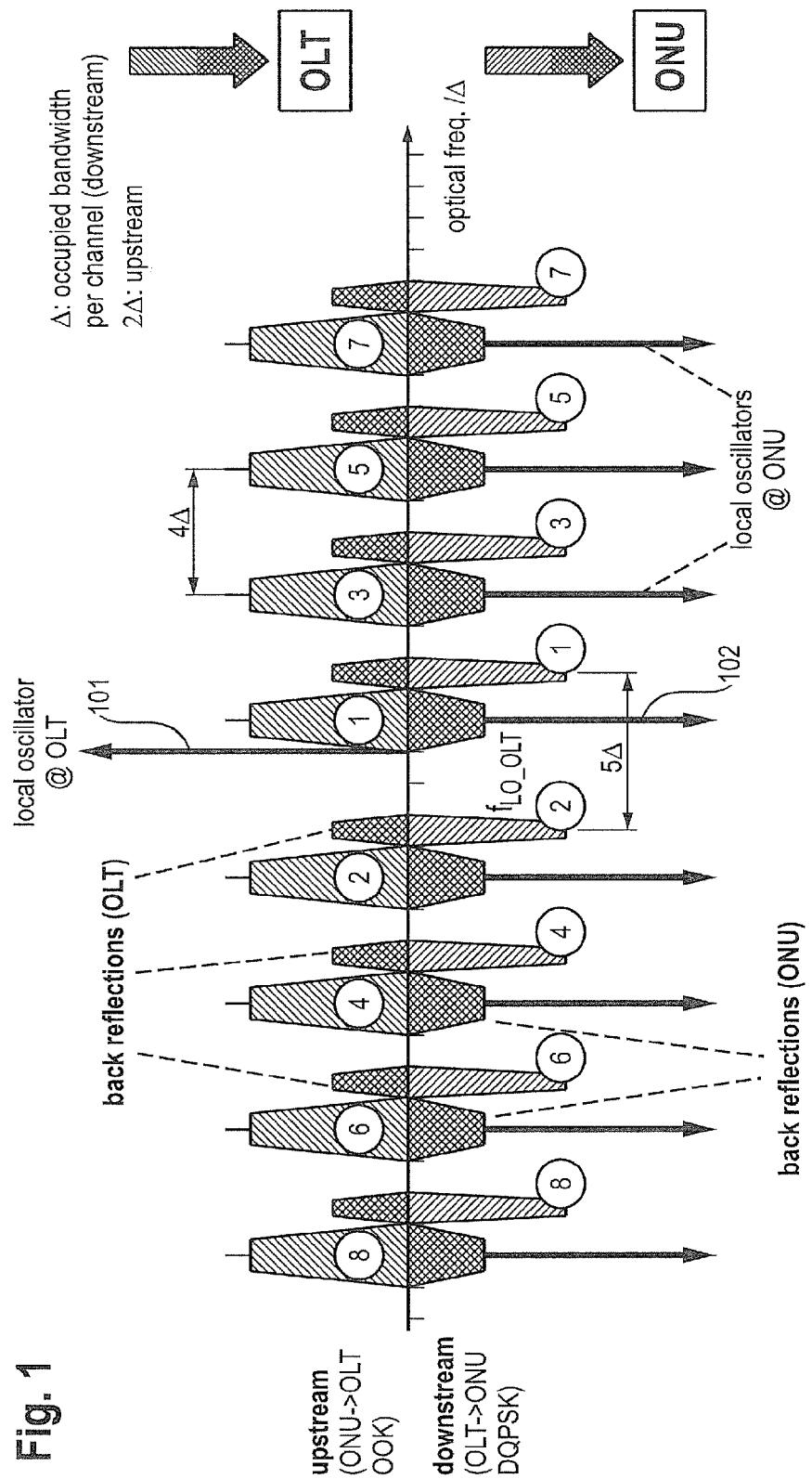
FIG. 1 shows an exemplary frequency plan in the optical domain with a minimized occupied bandwidth in the electrical and the optical domains.

FIG. 1 shows an exemplary frequency plan in the optical domain with a minimized occupied bandwidth in the electrical and the optical domains. The intermediate frequency (IF) is exemplarily set to 1.5$\Delta$.

A local oscillator 101 at the OLT is a reference for the frequencies (and bands) shown. On the left hand side of the local oscillator 101, channels with even channel numbers 2, 4, 6 and 8 are shown, on the right hand side of the local oscillator 101, channels with odd channel numbers 1, 3, 5 and 7 are shown. The x-axis indicates the optical frequency divided by $\Delta$.

Above the x-axis the upstream channels 1 to 8 from the ONUs to the OLT are shown including back reflections at the OLT. Below the x-axis the downstream channels 1 to 8 from the OLT to the ONUs are shown including back reflections at the ONU. The arrows pointing in downstream direction (comprising arrow 102) are the local oscillators at the ONUs.

As an example, the data is conveyed in upstream direction via OOK and in downstream direction via DQPSK. As the ONU uses OOK and the OLT used (D)QPSK as modulation scheme, the signal bandwidths per channel in upstream direction is 2-times the bandwidth in downstream direction. $\Delta$ describes the occupied bandwidth by a channel including tolerances and guard band in downstream direction and 2$\Delta$ describes the occupied bandwidth in upstream direction.

An optimized frequency plan can be determined based on at least one of the following conditions:

1. Utilize or apply a coherent heterodyne system.
2. As a bi-directional signal is conveyed via a single fiber, back-reflections should not interfere with received signal.

3. A channel bandwidth may be occupied including margins:
   a. in downstream direction: a bandwidth amounting to Δ (DQPSK);
   b. in upstream direction: a bandwidth amounting to 2Δ (OOK).
4. An electro-optical bandwidth of transmitters and receivers may be minimized, in particular at the OLT.
5. At the ONU, a baseband transmitter is used.
6. At the OLT receiver site, the center frequencies of the signals from the ONUs should be well separable center frequencies. At least the upper or the lower spectrum of each channel may not be distorted by other channels or back-reflections.

These conditions lead to a downstream channel separation of 4Δ as shown in FIG. 1. For the spacing between channel 1 and channel 2, 5Δ or 6Δ can be used. The intermediate frequency IF at the ONU amounts to 1.5Δ.

FIG. 2 shows a table comprising an exemplary optical and electrical frequency plan. The optical frequencies are based on a frequency f_0 of the transmitter, i.e. the local oscillator 101 (laser), at the OLT.

A column 201 comprises the channel number, a column 202 shows an optical frequency of the downstream channel, a column 203 shows an optical frequency of the associated ONU upstream channel, wherein all values are based on units of the occupied bandwidth Δ and relative to the frequency f_0 of the local oscillator at the OLT.

Columns 204 and 205 refer to the electrical domain, the channel band center frequency and the spectral range occupied by back-scattering and back-reflection of the downstream signals.

FIG. 3 shows a table comprising an alternative exemplary optical and electrical frequency plan. The explanations provided with regard to FIG. 2 apply accordingly.

Figure 4:
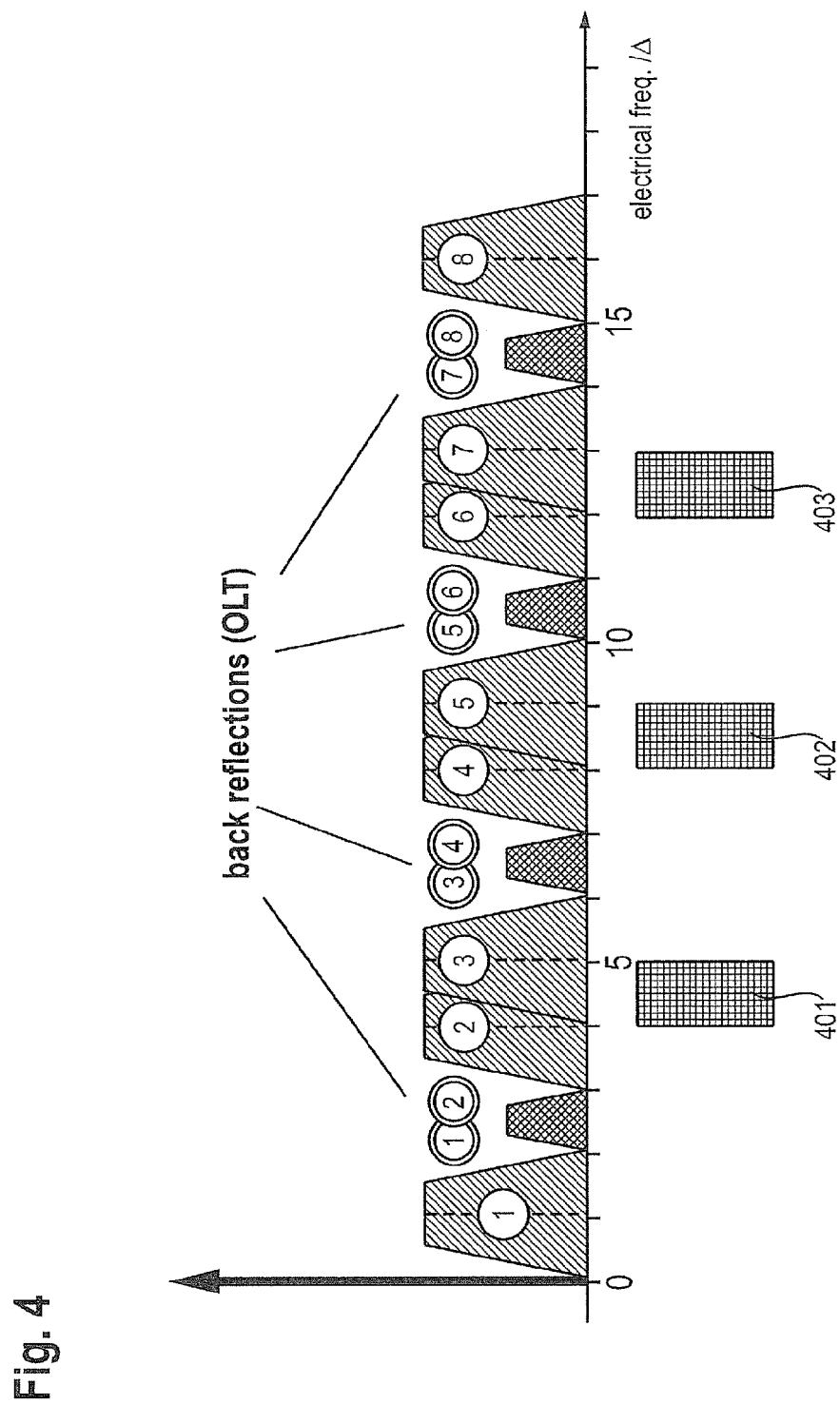
FIG. 4 shows the frequencies of the received signals at the OLT including the back-reflections from the signals sent by the OLT itself (in the electrical domain)

A part of the frequency plan of FIG. 3 is visualized in FIG. 4. Hence, FIG. 4 shows the frequencies of the received signals at the OLT including the back-reflections from the signals sent by the OLT itself. FIG. 4 refers to the electrical domain.

The spectra of the received signals overlap, which is indicated by spectral overlaps 401 to 403. However, filtering in combination with single sideband or vestigial sideband detection can be used to reconstruct the transmitted signal. Said filtering may comprise electrical (digital) filtering. In other words, OOK allows deriving the channel from a single sideband.

FIG. 4 shows how the channels can be derived from the respective sidebands: the lower sideband can be used to determine the even channels 2, 4 and 6; the upper sideband can be used to determine the odd channels 3, 5 and 7.

Figure 5:
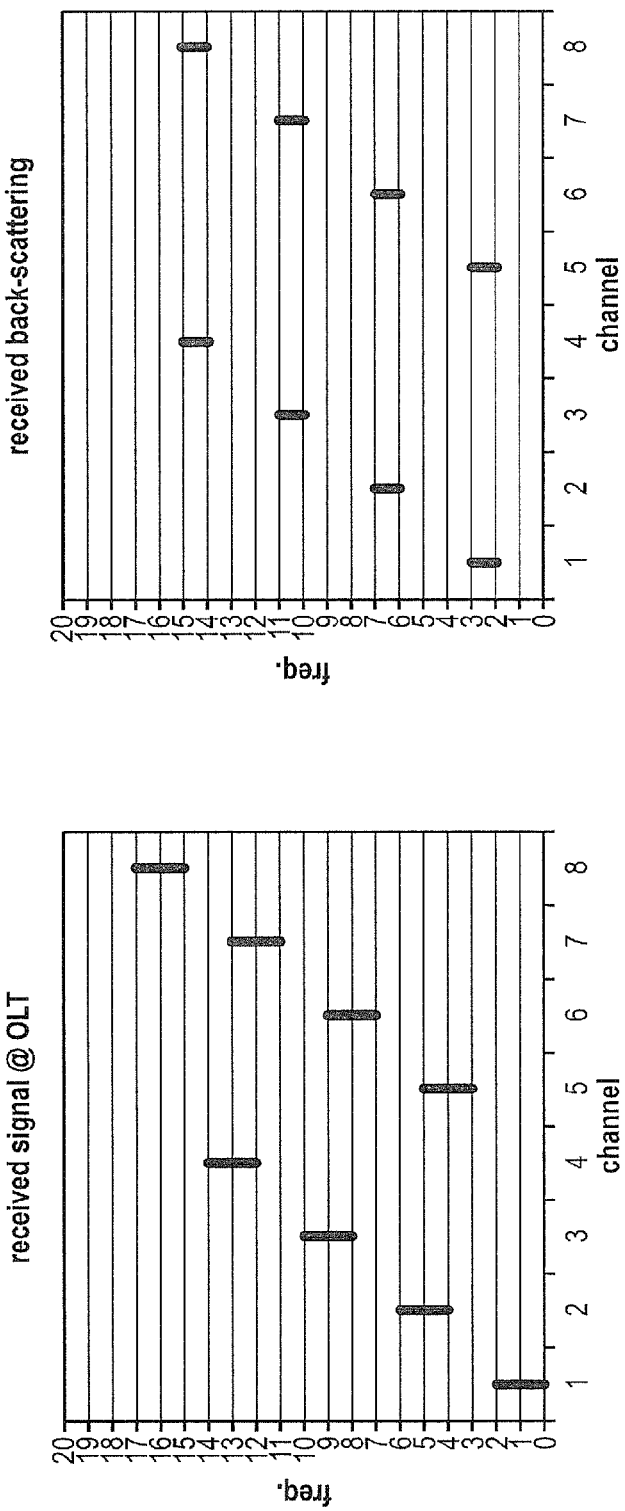
FIG. 5 shows the downstream direction frequency plan in the electrical domain in frequency units $\Delta$ depending on special implementation (data rate, modulation format) in correspondence to the table of FIG. 2.

FIG. 5 shows the downstream direction frequency plan in the electrical domain in frequency units Δ depending on special implementation (data rate, modulation format). FIG. 5 corresponds to the table shown in FIG. 2.

Figure 6:
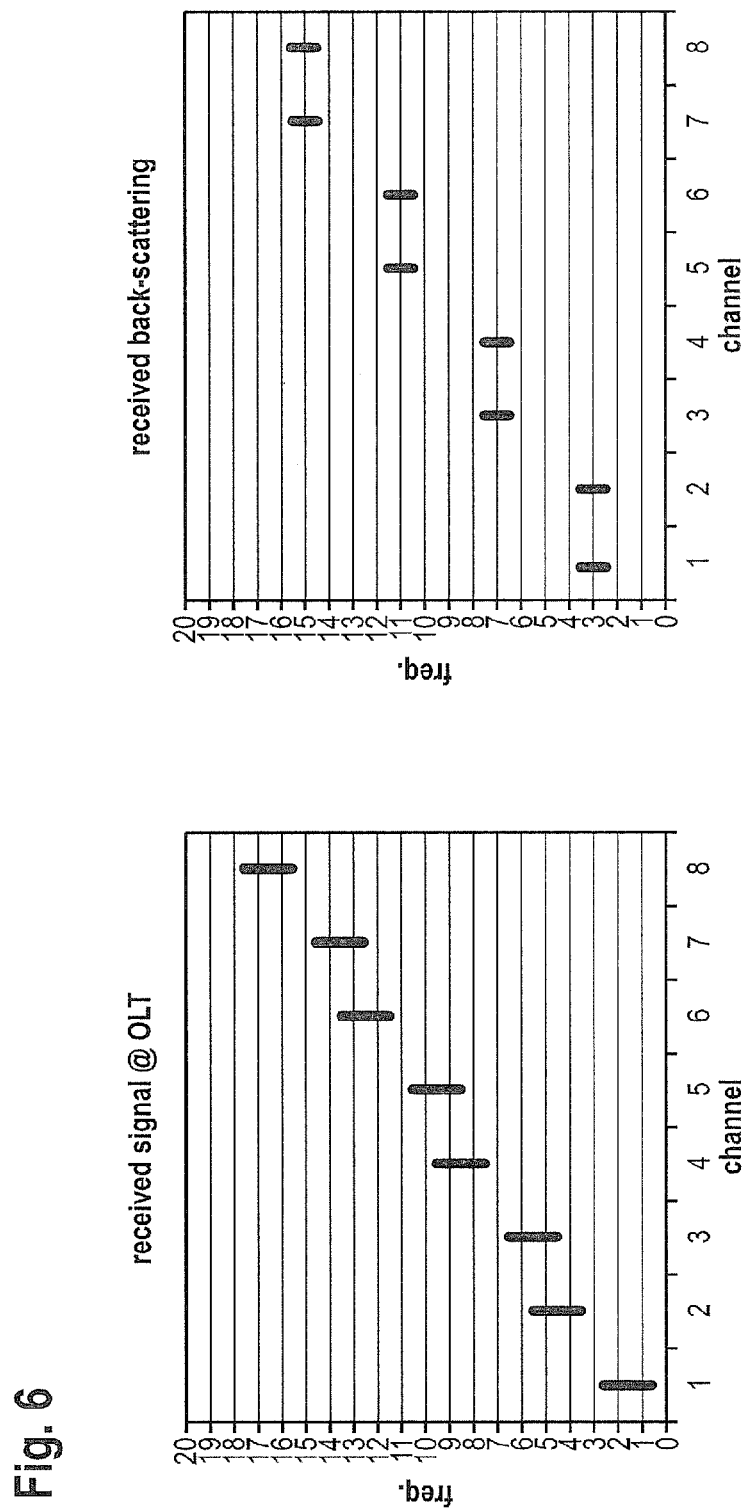
FIG. 6 shows a downstream direction frequency plan in frequency units depending on a special implementation (data rate, modulation format) according to the table shown in FIG. 3.

FIG. 6 shows a downstream direction frequency plan in frequency units depending on a special implementation (data rate, modulation format). In contrast to FIG. 5, the first OLT channels are at ±3Δ instead of +2.5Δ (according to the table shown in FIG. 3).

Figure 7A:
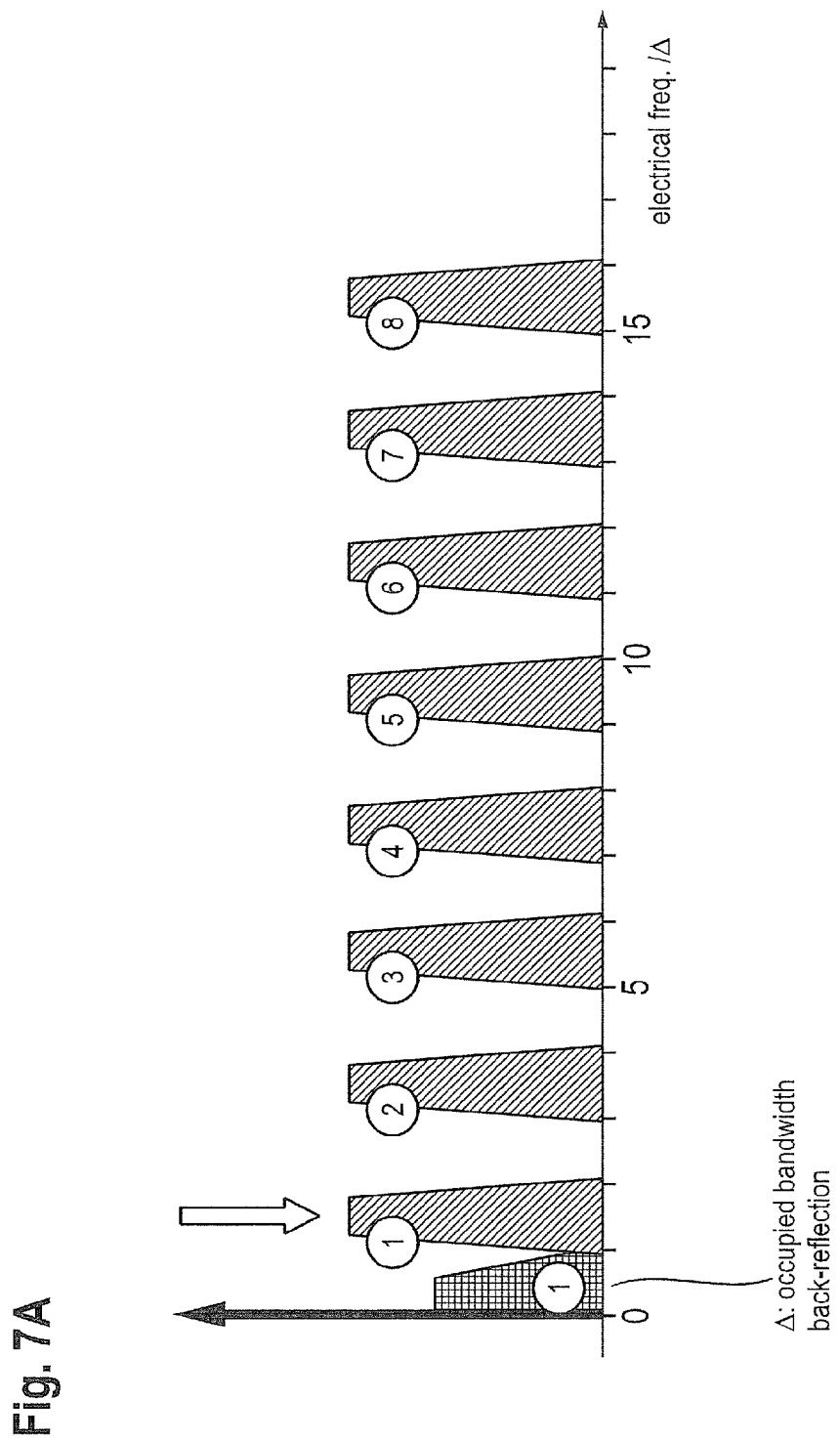
Figure 7B:
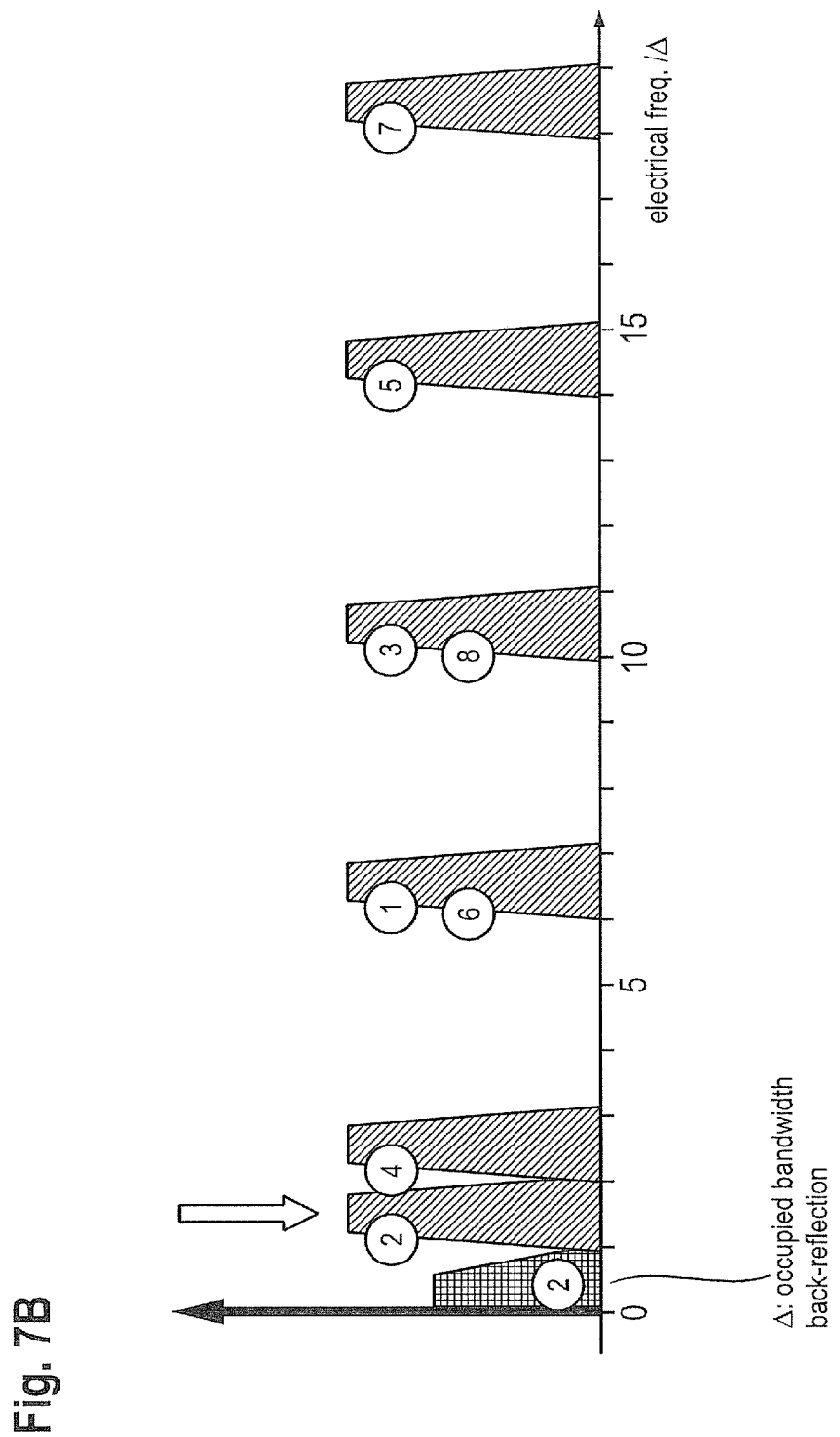

FIG. 7A shows a graphical representation of the position of the channel 1 at the receiver of ONU 1. FIG. 7B shows a graphical representation of the position of the channel 2 at the receiver of ONU 2. FIG. 7C shows a graphical representation of the position of the channel 3 at the receiver of ONU 3. FIG. 7D shows a graphical representation of the position of the channel 4 at the receiver of ONU 4.

FIG. 7A to FIG. 7D each refers to the electrical domain. Frequencies beyond the spectral range of 2Δ may be filtered out, because they contain no relevant information for the respective ONU.

For ONUs 5 to 8 the spectra are comparable and the desired signal is centered on a frequency amounting to 1.5Δ, wherein an upper frequency limit of disturbing signals amounts to 1Δ. Hence, there is no interference between wanted and unwanted signals.

Figure 8:
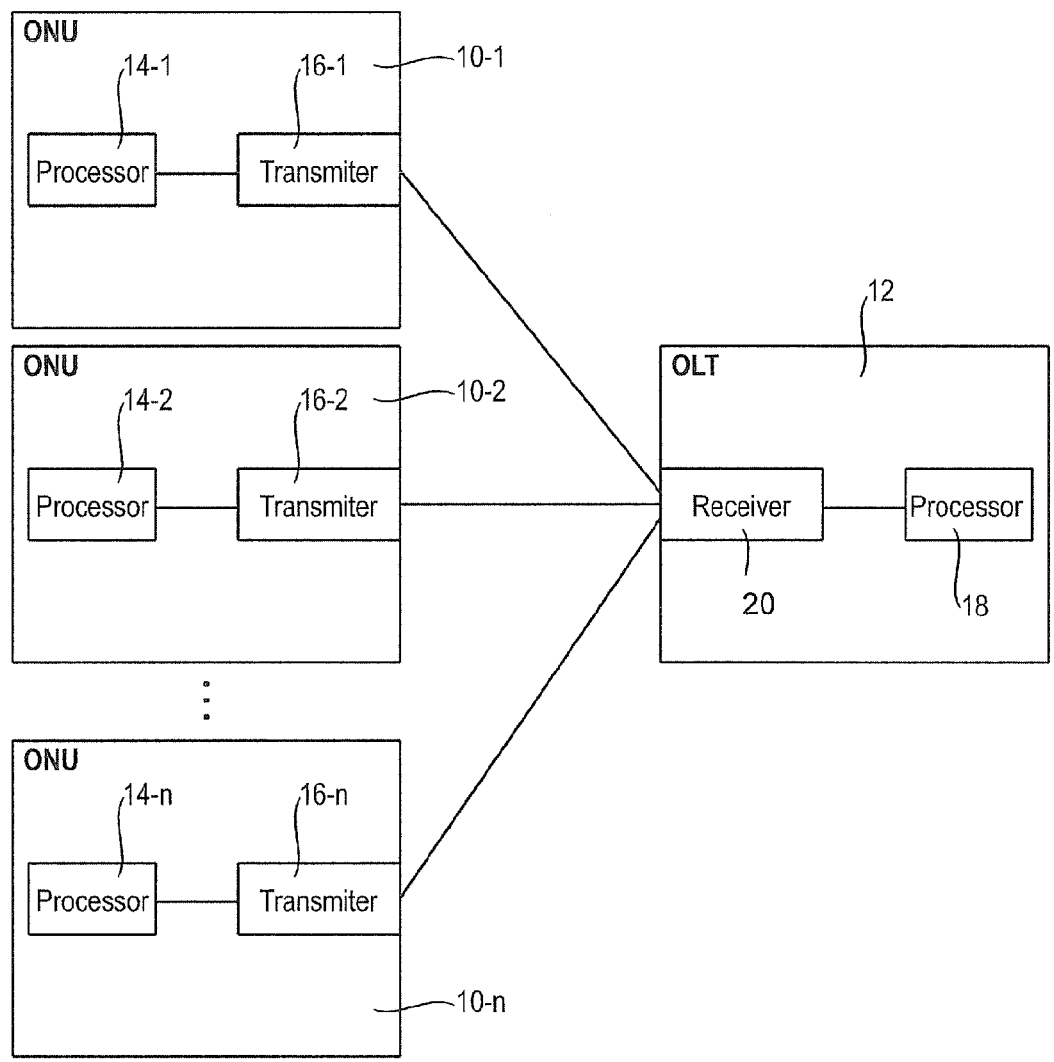
FIG. 8 shows a schematic diagram of one example of a communication system.

FIG. 8 shows a schematic diagram of one example of a communication system. The communication system comprises a number of optical network units 10-1, 10-2, . . . , 10-n which are optically connected with an optical line terminal 12. Each optical network unit 10-1, 10-2, . . . , 10-n comprises a processor 14 and a transmitter 16 (which are characterized by the same suffices -1, -2, . . . , -n as the respective ONUs, in FIG. 8). The OLT 12, in turn, comprises a processor 18 and a receiver 20. While the invention can be embodied in one of the optical network units and optical line terminals, the optical network units and optical line terminal can be combined in a communication system comprising at least one such optical line terminal 12 and one, two, or more optical network units 10-1, 10-2, . . . , 10-n. Having regard to the operation of the optical network units and optical line terminal, reference is made to the description above.

Further Advantages and Examples

The solution presented allows using simple and inexpensive components, in particular at the ONU. For example, the ONU may comprise only a single modulator, e.g., a MZM or an EAM instead of a more complex and more expensive IQ-modulator. The OLT may convey signals to several ONUs in downstream direction via (D)QPSK, but the ONUs could send upstream data to the OLT via OOK utilizing dual sideband transmission. The spectra of the dual sideband transmissions from the ONUs to the OLT may partially overlap (see FIG. 4), which saves overall bandwidth. However, these partially overlapping spectra could be reconstructed at the OLT, because with OOK information from a single sideband suffices to fully determine the signal transmitted. For this purpose, the spectral overlap may be filtered out and
  a left portion of the non-overlapping spectrum indicates the left single sideband of one channel (in the example of FIG. 4 the even channels) and
  a right portion of the non-overlapping spectrum indicates the right single sideband of another channel (in the example of FIG. 4 the odd channels).

For filtering the proper single sideband, a vestigial filter could be used. The filter may not be of ideal rectangular shape, but may be bell-shaped.

As an advantage, an increase of 3 dB or more in optical power is feasible due to the fact that OOK is used in upstream direction instead of DQPSK. As another advantage, the transmitter design at the ONU can be simplified and is thus more cost efficient: The transmitter does not require a single sideband modulator, no electrical 90-degrees hybrid or any orthogonal sine wave generator (as there is no modulation of two signals I and Q required). Instead, a single modulator driver suffices, which could be realized as an EAM (Electro Absorptions Modulator) in a cost-efficient manner.

LIST OF REFERENCE NUMBERS

Ch Channel
DQPSK Differential QPSK
EAM Electro Absorptions Modulator
FTTB Fiber-to-the-Business
FTTC Fiber-to-the-Curb
FTTH Fiber-to-the-Home
IF Intermediate Frequency
IQ In-phase and Quadrature components (used, e.g., for modulation)
LO Local Oscillator
MZM Mach-Zehnder Modulator
NGOA Next Generation Optical Access
OLT Optical Line Terminal
ONU Optical Network Unit
OOK ON-OFF keying
PON Passive Optical Network
PSK Phase Shift Keying
QPSK Quadrature PSK
RX Receiver
SSB Single Sideband
SSBM SSB Modulator
TX Transmitter
UDWDM Ultra Dense WDM
WDM Wavelength Division Multiplexing

The invention claimed is:

1. A method, comprising;
receiving data that has been modulated via dual sideband modulation at a terminal,
processing only an upper sideband or only a lower sideband of the data received from an optical network unit, and
wherein several dual sideband modulated signals from several optical network units partially overlap when being received at the terminal.

2. The method according to claim 1, wherein the terminal is an optical line terminal connected to the several optical network units.

3. The method according to claim 2, wherein each of the optical network units is assigned a predetermined optical bandwidth or wavelength.

4. The method according to claim 1, wherein portions of the dual sideband modulated signals that partially overlap are at least partially filtered out.

5. The method according to claim 4, wherein single sideband detection or vestigial sideband detection is performed at the terminal.

6. The method according to claim 1, wherein the optical network unit conveys data to the terminal via on-off-keying.

7. The method according to claim 1, further comprises conveying additional data from the terminal to the optical network unit via QPSK or DQPSK modulation.

8. The method according to claim 1, further comprising determining a frequency plan for conveying data from the several optical network units to the terminal in a coherent heterodyne communication system utilizing margins as follows:
a bandwidth amounting to $\Delta$ in a downstream direction; and
a bandwidth amounting to $2\Delta$ in an upstream direction,
wherein $\Delta$ determines a bandwidth occupied by a channel.

9. An optical line terminal device comprising a processing unit, the device including:
a component for receiving data from at least two optical network units, which data is dual sideband modulated, wherein spectra of the data received from two optical network units overlap; and
a component for processing only an upper sideband or only a lower sideband of the data received to reconstruct data from one of the optical network units.

10. The device according to claim 9, wherein the component for processing uses the upper sideband or the lower sideband received to reconstruct data by single sideband processing or vestigial sideband processing in combination with filtering of the overlap of the spectra.

11. An optical network unit comprising a processing unit, the optical network unit including:
a component for dual sideband modulating and
a component for transmitting data to an optical line terminal,
wherein a spectrum of the data transmitted at least partially overlap with at least one spectrum used by another optical network unit such that an upper sideband or a lower sideband received by the optical line terminal can be used to reconstruct data from the optical network unit.

12. A communication system comprising at least one optical line terminal according to claim 9 and at least one of the optical network units according to claim 11.

13. A communication system comprising at least one optical line terminal according to claim 9 and at least two of the optical network units according to claim 11.

* * * * *